(12) United States Patent
Chang

(10) Patent No.: US 6,224,813 B1
(45) Date of Patent: May 1, 2001

(54) METHOD FOR CONTROLLING TEMPERATURE OF MOLD FOR INJECTION MOLDING

(75) Inventor: Jae Eon Chang, Seoul (KR)

(73) Assignee: Daewoo Electronics Co., Ltd., Seoul (KR)

( * ) Notice: Subject to any disclaimer, the term of this patent is extended or adjusted under 35 U.S.C. 154(b) by 0 days.

(21) Appl. No.: 09/233,462

(22) Filed: Jan. 20, 1999

(30) Foreign Application Priority Data

Nov. 24, 1998 (KR) .................................................. 98-50388

(51) Int. Cl.[7] .................................................. B29C 45/73
(52) U.S. Cl. .................................. 264/328.12; 264/328.16
(58) Field of Search ........................ 264/328.12, 328.14, 264/328.15, 328.16, 40.6; 425/144, 552, 548

(56) References Cited

U.S. PATENT DOCUMENTS

| | | | |
|---|---|---|---|
| 4,338,068 | * | 7/1982 | Suh et al. .................... 264/328.16 |
| 5,656,228 | * | 8/1997 | Fujii et al. .................... 264/328.16 |
| 5,762,972 | * | 6/1998 | Byon ............................. 264/328.16 |
| 5,772,933 | * | 6/1998 | Kotzab .......................... 264/328.16 |
| 5,830,515 | * | 11/1998 | Pleasant et al. ............... 264/328.16 |

FOREIGN PATENT DOCUMENTS

| | | | |
|---|---|---|---|
| 59-140040 | * | 8/1984 | (JP) .................................. 264/328.16 |
| 62-176815 | * | 8/1987 | (JP) .................................. 264/328.16 |
| 88/00116 | * | 1/1988 | (WO) ............................... 264/328.16 |

* cited by examiner

Primary Examiner—Jill L. Heitbrink
(74) Attorney, Agent, or Firm—Pillsbury Madison & Sutro LLP

(57) ABSTRACT

Disclosed is a method for controlling the temperature of a mold for injection molding. The temperature of a front surface portion of an upper mold neighbored a gate which is connected to a spool to which the melted resin is injected through a runner, is controlled as 65–75° C. The temperature of a side surface portion of the upper mold between the front surface portion and a parting line, is controlled as 45–55° C. Then, a cavity portion corresponding to the upper mold is formed. The temperature of a core portion which is positioned at a concave portion of a mould product, is controlled as 35–45° C. The generation of a weld line or a chromic aberration can be restrained.

1 Claim, 2 Drawing Sheets

METHOD FOR CONTROLLING TEMPERATURE OF MOLD FOR INJECTION MOLDING

BACKGROUND OF THE INVENTION

1. Field of the Invention

The present invention relates to a method for controlling the temperature of a mold for an injection molding and more particularly, to a method for controlling the temperature of a mold for an injection molding for restraining the generation of a weld line and a chromatic aberration at the position where two melted and separated resins flow together, by separately controlling the temperature of each region of the mold.

2. Description of the Related Art

Generally, among the molding conditions of the injection molding, injecting pressure, injecting velocity, weighing and the temperature of the injector can be controlled using a controller mounted on the injector. However, the temperature of the mold should be separately and externally controlled. Otherwise, the control of the temperature of the mold is difficult.

At this time, when the temperature of the mold is controlled simply by cold water, the temperature of the mold becomes different on each region of the mold because of the change of the external environment and the flow of the melted resin in the cavity. Therefore, a continuous working for manufacturing a good product could not be accomplished. Further, even though the continuous working is not required, the molding condition should be frequently changed for the stability of the products. If the temperature of the mold is not constantly controlled, the standardization of the molding condition could not be accomplished due to the change of the injecting pressure, injecting velocity, etc.

Even though the size of the mold is dependent on the size of the mould product, initial defect may be generated during increasing the temperature of the mold from the low temperature state of the mold to the temperature of the mold where the good product can be obtained. As a result, the establishment of the standard molding condition is difficult.

For solving the above-mentioned problem, generally the injecting pressure is increased. In this case, the temperature of the mold increases to some degree according to the increase of the injecting pressure, however, burr of the mould product at the parting line may be generated.

FIG. 1 illustrates the relation of the temperature of the mold with respect to the distribution of the number of defects. Region A corresponds to the portion at which the molding is not completed and so a compression defect is generated. Region B corresponds to the medium portion of the good product and the defect. At region B, a crack may be generated owing to the defect of the weld line and this portion affects the reliability of the product. For minimizing this region, the mold is heated in advance through implementing a preheating process for stabilizing the temperature of the mold.

It is important to keep the temperature of the mold at a constant degree through heating as described above, however, it also is important to cool the mold for the cycle time of the mold.

The controlling of the temperature of the mold plays an important role for improving the productivity of the product and also plays an important role for generating the defect of the product.

That is, when the temperature of the mold is not homogeneous, a compression defect is generated at a boss portion and/or a rib portion where compression degrees are great. And when the temperature of the mold is too low, the molding is not completed or a silver streak defect is generated. Further, a defect of deflection deformation also is generated owing to the regional difference of the mold temperature.

Among the defects, the weld line generated on the surface of the product, is formed as a thin solid line at the portion where two melted and separated resins flow together in the mold. The main reason of the generation of the weld line is the incomplete mixing of the two separated and melted resins at the meeting portion because of the low temperature of the front end portions of two resins. The weld line also can be generated by moisture or a volatile matter contained in the resin, or by a mold release used during the injection molding.

Particularly, the generation of the weld line is caused when a hole is present in a mould product or two gates are present in the mold. For carrying out the injection molding, the gate for passing the resin is needed. And when the mould product is large or complicated, two or more gates are needed. Accordingly, the weld line is liable to be formed. Even though the melted resin is supplied through one gate, when an inserting component or a hole is present in the mould product or when the building thickness of the mould product is different, the weld line may be generated.

FIGS. 2A and 2B are typical views for explaining the generating process of the weld line. The melted resin is supplied into the cavity through two gates 12 and 14 and a weld line 16 is generated where the two separated portions of the resin flow together as shown in FIG. 2A.

At this time, the weld line is not formed even though the separated and melted resins flow together near the gates 12 and 14 but the weld line is formed far from the gates 12 and 14. The melted resin gets cool through the mold and the two portions far from the gates 12 and 14 could not mix together completely because of the low temperature of the resins, thereby generating the weld line 16.

Meanwhile, even though the melted resin is supplied through one gate 12, the weld line 16 is generated when a hole 18 is provided in the mould product because the melted resin is separated around the hole 18 and then flow together, as shown in FIG. 2B.

Thus formed weld line deteriorates the exterior view of the mould product and therefore, a painting process for eliminating the weld line is additionally implemented after the injection molding. This makes the working process complicated and increases the manufacturing cost.

SUMMARY OF THE INVENTION

Accordingly, it is an object of the present invention considering the above-mentioned problem, to provide a method for controlling the temperature of the mold for an injection molding for restraining the generation of a weld line at the position where two melted and separated resins flow together or restraining a chromatic aberration at the surface of a product, by separately controlling the temperature of each region of the mold.

To accomplish the object, there is provided in the present invention a method for controlling the temperature of a mold for the injection molding comprising an upper mold having a recess and a lower mold having a core portion protruded in the recess of the upper mold to form a mold cavity therebetween, said method comprising the steps of: controlling a temperature of a front surface portion of the upper mold neighboring a gate which is connected to a spool to which the melted resin is injected through a runner, as 65–75° C.; controlling a temperature of a side surface portion of the upper mold between the front surface portion and a parting line, as 45–55° C.; and controlling temperature of the core portion, as 35–45° C.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE PREFERRED EMBODIMENTS

Hereinafter, the method for controlling the temperature of a mold for an injection molding according to a preferred embodiment of the present invention will be explained in more detail with reference to the accompanying drawings.

Figure 1:
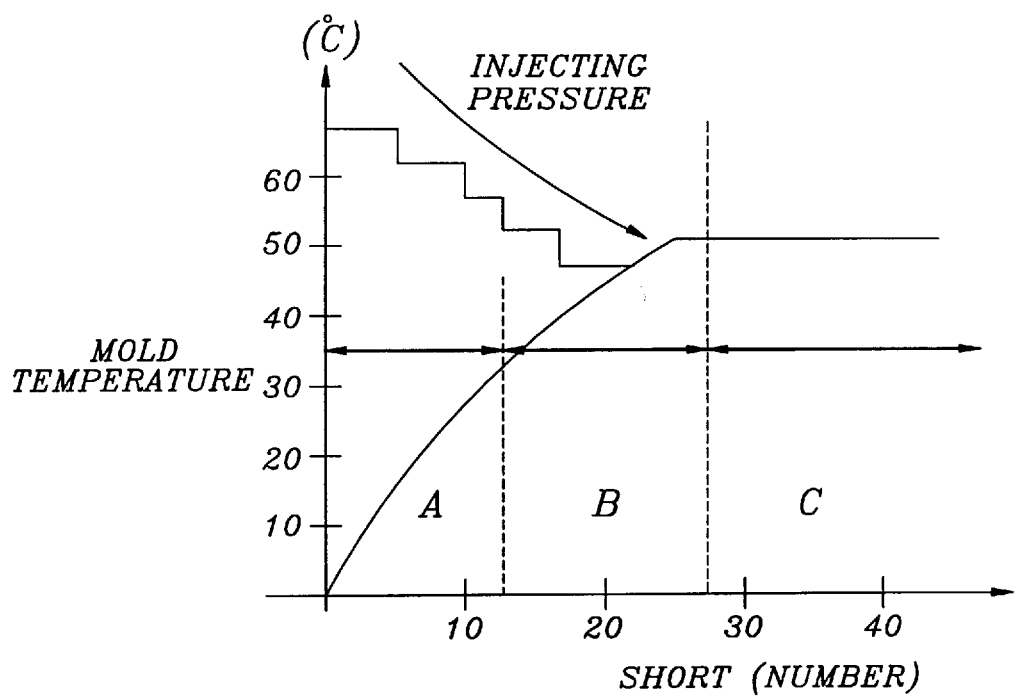
FIG. 1 illustrates the relation of the temperature of a mold with respect to the distribution of the number of defects.
Figure 2A:
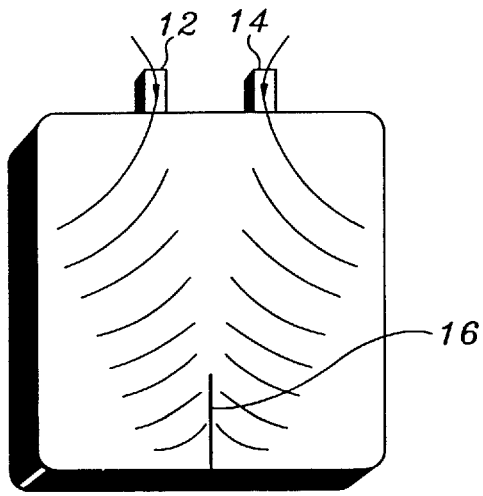
FIG. 2A is a typical view for illustrating the forming process of a weld line when a melted resin is supplied into two gates.
Figure 2B:
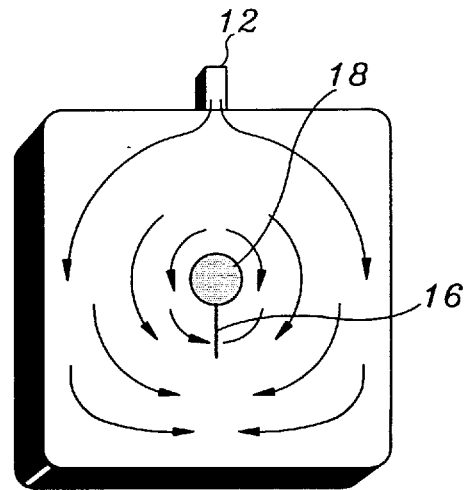
FIG. 2B is a typical view for illustrating the forming process of a weld line around a hole.
Figure 3A:
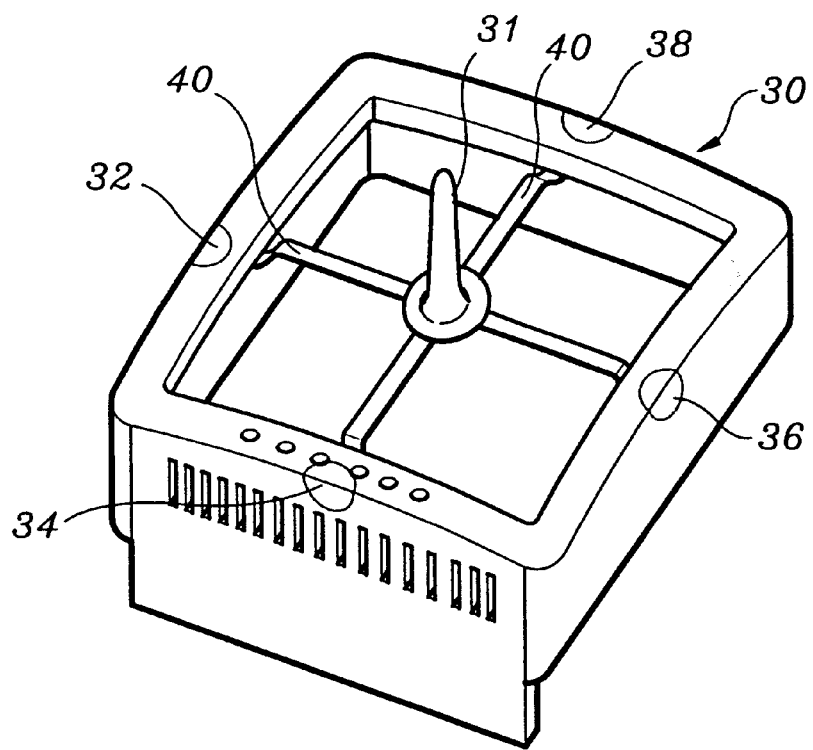
FIG. 3A schematically illustrates the process of injection molding a television case.

FIG. 3A schematically illustrates the process of injection molding a television case. In this figure, a spool 31 and four gates 32, 34, 36 and 38 are connected through a runner 40 at the front surface portion of a television case 30. A Polystyrene-based melted resin supplied from the spool 31, is supplied to the four gates 32, 34, 36 and 38 through the runner 40. The melted resin flows from the central portion of the cavity to the outer portion of the cavity.

Figure 3B:
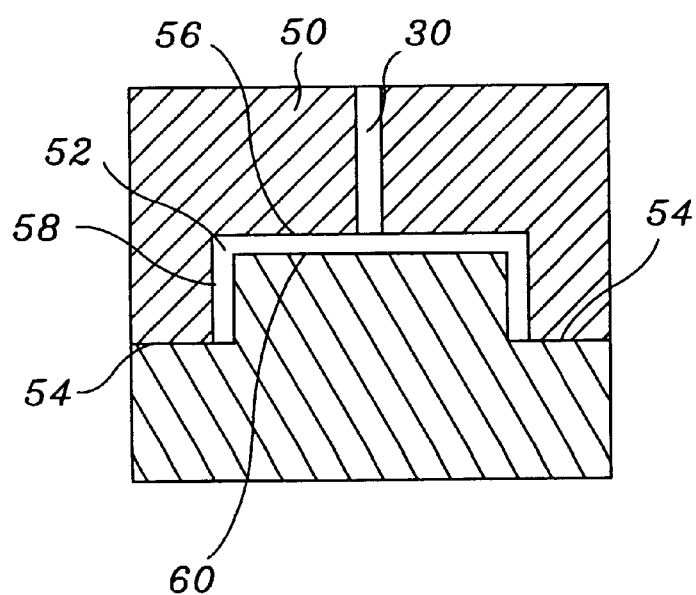
FIG. 3B is a cross-sectional view of a mold for injection molding a television case.

FIG. 3B is a cross-sectional view of a mold for injection molding a television case. Melted resin is injected to a cavity portion 52 through the spool 31 provided at the center portion of an upper mold 50 and fills up into a parting line 54.

At this time, if the temperature of a front surface portion 56 neighboring the gate of the upper mold 50 is controlled below 65° C., the melted resin supplied from a region neighboring parting line 54 to another gate, is cooled and two separated resins do not completely mixed. Accordingly, the weld line is formed. If the temperature is over 75° C., the resin is decomposed and so gas may be generated. Therefore, it is preferred that the temperature is controlled in the range of 65–75° C.

At this time, at the region where an insert hole is formed near the front surface portion and a joining portion of two melted resins, the temperature is kept by passing warm water or using a heat block.

Further, at a side surface portion 58 of the upper mold, if the temperature of the injected resin is high and above 55° C., gas and regional pressure difference are generated and chromatic defects such as chromatic stain, low gloss, etc. may appear. If the temperature of the resin is controlled below 45° C., the weld line may be possibly formed where two melted resins flow together between the gates. Therefore, the preferred temperature range is 45–55° C.

At this time, the side surface portion 58 of the upper mold preferably includes a stepped portion at the mixing portion of two separated resins for limiting the flow of the melted resin and a bent is formed at the parting line for effectively controlling the weld line. In this case, the temperature of the resin need not be specifically high.

Meanwhile, since thick portions such as a boss or a rib is present at a core portion 60 of the lower mold, the heat may concentrate to form a sink mark at the surface of the mould product. Therefore, the temperature of the core portion 60 is preferably controlled at the lower temperature of 35–45° C. than the temperature at the side surface portion 58.

For preventing the concentration of the heat at the core portion 60, materials having high heat transferring velocity such as aluminum are preferably used.

At this time, the controlling of the temperature could be implemented by heating the front surface portion 56 and the side surface portion 58 using a heater or warm water and by cooling the core portion 60 using a cooling water.

The generation of the defect could be minimized by controlling the temperature of each region of the mold within an optimal range considering the flow of the melted resin at each region of the mold and the shape of the mould product.

As described above, the temperatures at the front surface portion, the side surface portion and the core portion of the lower mold are separately controlled at different temperature ranges considering the shape of the mold. Accordingly, the generation of the weld line, the sink mark and the chromatic aberration of the surface can be minimized and thus the post-process concerning the defects can be eliminated in the present invention.

Although the preferred embodiment of the invention has been described, it is understood that the present invention should not be limited to the preferred embodiment, but various changes and modifications can be made by one skilled in the art within the spirit and scope of the invention as hereinafter claimed.

What is claimed is:

1. A method for controlling the temperature of a mold for an injection molding comprising an upper mold having a recess and a lower mold having a core portion protruded into the recess of the upper mold to form a mold cavity therebetween, said method comprising the steps of:

controlling a temperature of a front surface portion of said upper mold neighboring a gate which is connected to a spool to which a melted resin is injected through a runner, as the range of 65–75° C.;

controlling a temperature of a side surface portion of said upper mold between said front surface portion and a parting line, as the range of 45–55° C.; and controlling a temperature of said core portion, as the range of 35–45° C.

* * * * *